US012487306B2

(12) United States Patent
Wang et al.

(10) Patent No.: US 12,487,306 B2
(45) Date of Patent: Dec. 2, 2025

(54) SYSTEM AND METHOD FOR VARIABLE-FLIP-ANGLE 3D SPIRAL-IN-OUT TSE/SPACE USING ECHO-REORDERING AND CONCOMITANT GRADIENT COMPENSATION

(71) Applicant: University of Virginia Patent Foundation, Charlottesville, VA (US)

(72) Inventors: Zhixing Wang, Charlottesville, VA (US); Rajiv Ramasawmy, Bethesda, MD (US); Ahsan Javed, Vienna, VA (US); John P. Mugler, III, Charlottesville, VA (US); Craig H. Meyer, Charlottesville, VA (US); Adrienne E. Campbell, Washington, DC (US)

(73) Assignees: University of Virginia Patent Foundation, Charlottesville, VA (US); The United States of America, as represented by the Secretary, Department of Health and Human Services, Washington, DC (US)

( * ) Notice: Subject to any disclaimer, the term of this patent is extended or adjusted under 35 U.S.C. 154(b) by 156 days.

(21) Appl. No.: 18/402,593

(22) Filed: Jan. 2, 2024

(65) Prior Publication Data

US 2024/0272258 A1 Aug. 15, 2024

Related U.S. Application Data

(60) Provisional application No. 63/436,679, filed on Jan. 2, 2023.

(51) Int. Cl.
*G01R 33/58* (2006.01)
*G01R 33/561* (2006.01)

(52) U.S. Cl.
CPC ....... *G01R 33/5615* (2013.01); *G01R 33/586* (2013.01)

(58) Field of Classification Search
CPC .. G01R 33/54; G01R 33/586; G01R 33/5615; G01R 33/00; G01R 33/0035;
(Continued)

(56) References Cited

U.S. PATENT DOCUMENTS

| 2013/0099784 A1* | 4/2013 | Setsompop | G01R 33/543 324/309 |
| 2013/0123611 A1* | 5/2013 | Riederer | A61B 5/0263 600/419 |

(Continued)

OTHER PUBLICATIONS

International Search Report and Written Opinion, PCT/US2024/010067, dated Apr. 29, 2024.
(Continued)

*Primary Examiner* — Jermele M Hollington
*Assistant Examiner* — Taqi R Nasir
(74) *Attorney, Agent, or Firm* — Meunier Carlin & Curfman LLC

(57) ABSTRACT

Acquiring 3D MRI data using spiral-in-out encoding trajectories includes calculating a variable flip angle RF series for use as refocusing pulses, wherein the RF series includes a plurality of refocusing RF pulses. A spoiler gradient waveform is applied along the spoiler gradient direction, wherein the computer alternately adds and subtracts partition encoding waveforms to the spoiler gradient waveform. The method reads MRI data from each encoding step during an MRI sequence. The MRI sequence inserts a spiral-in gradient before a first refocusing RF pulse from the RF sequence, overlaps a pre-winder lobe for the encoding trajectory with the spoiler gradient waveform having the partition encoding waveforms added therein, and overlaps a rewinder lobe for
(Continued)

the encoding trajectory with the spoiler gradient waveform having the partition encoding waveforms subtracted there from.

20 Claims, 8 Drawing Sheets

(58) Field of Classification Search
CPC ... G01R 33/0358; G01R 33/0356; A61B 5/055; H01L 39/223
See application file for complete search history.

(56) References Cited

U.S. PATENT DOCUMENTS

| | | | | |
|---|---|---|---|---|
| 2015/0369891 | A1* | 12/2015 | Miyazaki | G01R 33/5617 324/309 |
| 2018/0106879 | A1* | 4/2018 | Johnson | G01R 33/56358 |
| 2022/0357416 | A1* | 11/2022 | Mugler, III | G01R 33/5617 |

OTHER PUBLICATIONS

Mugler JP 3rd. Optimized three-dimensional fast-spin-echo MRI. J Magn Reson Imaging. 2014;39(4):745-767.

Hennig J, Weigel M, Scheffler K. Calculation of flip angles for echo trains with predefined amplitudes with the extended phase graph (EPG)-algorithm: principles and applications to hyperecho and TRAPS sequences. Magn Reson Med. 2004; 51: 68-80.

Busse RF, Hariharan H, Vu A, Brittain JH. Fast spin echo sequences with very long echo trains: design of variable refocusing flip angle schedules and generation of clinical T2 contrast. Magn Reson Med. 2006;55(5):1030-1037.

Campbell-Washburn AE et al. Opportunities in interventional and diagnostic imaging by using high-performance low-field-strength MRI. Radiology. 2019; 293:384-393.

Li Z, Wang D, Robison RK, et al. Sliding-slab three-dimensional TSE imaging with a spiral-in/out readout. Magn Reson Med. 2016;75:729-738.

Wang Z, Allen SP, Feng X, Mugler JP, Meyer Ch. Spring-Rio TSE: 2D T2-Weighted Turbo Spin-Echo Brain Imaging using SPiral Rings with Retraced In/Out Trajectories. Magn Reson Med. 2022; 88:601-616.

Restivo MC, Ramasawmy R, Bandettini WP, Herzka DA, Campbell-Washburn AE. Efficient spiral in-out and EPI balanced steady-state free precession cine imaging using a high-performance 0.55T MRI. Magn Reson Med. 2020;84:2364-2375.

Wang Z, Ramasawmy R, Feng X, Campbell-Washburn AE, Mugler JP, Meyer CH. Concomitant magnetic-field compensation for 2D spiral-ring turbo spin-echo imaging at 0.55T and 1.5T. Magn Reson Med. 2023;90(2):552-568.

Ramasawmy R, Mugler JP, Ahsan J, Wang Z, Herzka DA, Meyer CH, Campbell-Washburn AE. Concomitant field compensation of spiral turbo spin-echo at 0.55 T. Magn Reson Mater Phy. 2023; 10.1007/s10334-023-01103-0.

Zhou XJ, Tan SG, Bernstein MA. Artifacts induced by concomitant magnetic field in fast spin-echo imaging. Magn Reson Med. 1998; 40:582-591.

Vannesjo SJ, Haeberlin M, Kasper L, Pavan M, Wilm BJ, Barmet C, Pruessmann KP. Gradient system characterization by impulse response measurements with a dynamic field camera. Magn Reson Med. 2013; 69: 583-593.

Li Z, Karis JP, Pipe JG. A 2D spiral turbo-spin-echo technique. Magn Reson Med. 2018;80:1989-1996. .

Uecker M, Lai P, Murphy MJ, Virtue P, Elad M, Pauly JM, Vasanawala SS, Lustig M. Espirit—an eigenvalue approach to auto-calibrating parallel MRI: where Sense meets GRAPPA. Magn Reson Med. 2014;71:990-1001.

Griswold MA, Jakob PM, Heidemann RM, Nittka M, Jellus V, Wang J, Kiefer B, Haase A. Generalized auto-calibrating partially parallel acquisitions (GRAPPA). Magn Reson Med. 2002;47:1202-1210.

Robson PM, Grant AK, Madhuranthakam AJ, Lattanzi R, Sodickson DK, McKenzie CA. Comprehensive quantification of signal-to-noise ratio and g-factor for image-based and k-space based parallel imaging reconstructions. Magn Reson Med. 2008;60:895-907.

Koonjoo N, Zhu B, Bagnall GC, Bhutto D, Rosen MS. Boosting the signal-to-noise of low-field MRI with deep learning image reconstruction. Sci Rep. 2021;11(1):8248.

Dou Q, Wang Z, Feng X, Meyer CH. MRI Denoising with a Non-Blind Deep Complex-Valued Convolutional Neural Network. In Proceedings of the 32nd Annual Meeting of ISMRM, Toronto, CA, 2023. p. 3887.

* cited by examiner

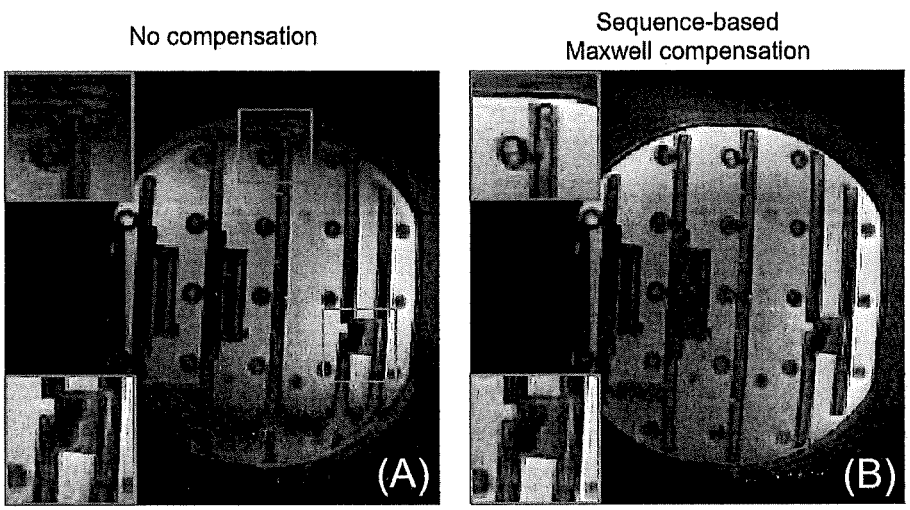
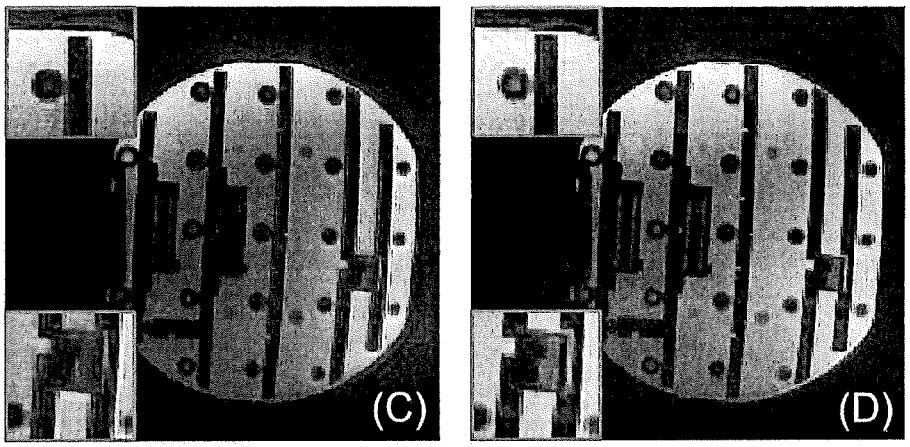
FIG. 2A  FIG. 2B
FIG. 2C  FIG. 2D

No Maxwell compensation

Sequence-based Maxwell compensation only

Sequence- & image recon- based Maxwell compensation

TABLE S1 Sequence Parameters for Spiral SPACE and Cartesian SPACE at 0.55 T.
| Sequences | FOV (mm³) | TR (ms) | TE eff ms | Read out (ms) | ESP (ms) | ETL | # Shots | Acceleration Method | Acceleration Ratio | Scan Time (min) | Spatial Res. (mm³) |
|---|---|---|---|---|---|---|---|---|---|---|---|
| Spiral Space | 200 x 250 x 160 | 2700 | 111 (GM) | 4.48 | 7.2 | 80 | 54 | L1-Espirit | 1/2 | 4:50 / 9:43 | 1 x 1 x 1 |
| Cartesian Space | 200 x 250 x 160 | 3500 | 115 (GM) | 1:1 | 3.3 | 250 | 160 | GRAPPA | 1/2 | 4:54 / 9:39 | 1 x 1 x 1 |
FIG. 5
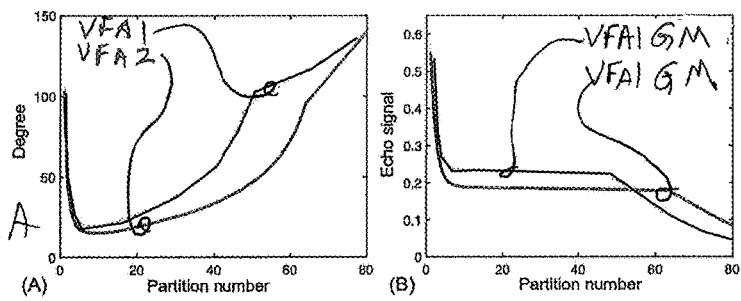
FIG. 6A
FIG. 6B
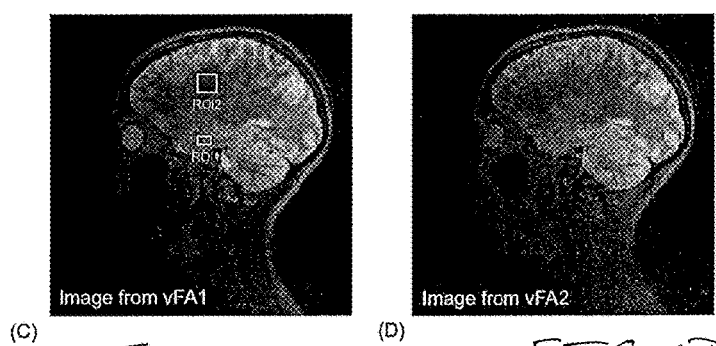
FIG. 6C
FIG. 6D

SYSTEM AND METHOD FOR VARIABLE-FLIP-ANGLE 3D SPIRAL-IN-OUT TSE/SPACE USING ECHO-REORDERING AND CONCOMITANT GRADIENT COMPENSATION

CROSS-REFERENCE TO RELATED APPLICATION

This application claims priority to and benefit under 35 U.S.C § 119(e) of U.S. Provisional Patent Application Ser. No. 63/436,679 filed on Jan. 2, 2023, which is incorporated by reference as if set forth fully herein.

STATEMENT REGARDING FEDERALLY FUNDED RESEARCH

This invention was made with government support under NIH Grant No. EB028773 awarded by National Institutes of Health. The government has certain rights in the invention.

FIELD

The present disclosure relates to magnetic resonance imaging (MRI) operations that, according to some aspects, reconstructs MRI images from spirally acquired MRI data and provides final images having suppressed artifact images across numerous imaging domains.

BACKGROUND

The present disclosure generally relates to the field of medical imaging for analysis of certain physiological activities of a subject. For example, and without limiting this disclosure, various conventional imaging techniques can provide for an assessment of a body of a subject with regard to spatial coverage. Two-dimensional (2D), three-dimensional (3D), and "cine" data measurements can provide a complete assessment of a subject, such as a human patient, with regard to spatial coverage and a comprehensive evaluation of certain areas.

This disclosure addresses a need in the art of MRI data acquisition left by conventional Cartesian sampling that remains time consuming because of its relatively inefficient k-space coverage when prescribing high-isotropic spatial resolution. This problem becomes worse at low-field systems compared to the mid- or high-field systems, due to the inherently lower signal to noise ratio, which requires several signal averages to maintain clinically acceptable image quality and thus increases the total scan time by at least double.

SUMMARY

Other aspects and features according to the example embodiments of the disclosed technology will become apparent to those of ordinary skill in the art, upon reviewing the following detailed description in conjunction with the accompanying figures.

Acquiring 3D MRI data using spiral-in-out encoding trajectories includes calculating a variable flip angle RF series for use as refocusing pulses, wherein the RF series includes a plurality of refocusing RF pulses. A spoiler gradient waveform is applied along the spoiler gradient direction, wherein the computer alternately adds and subtracts partition encoding waveforms to the spoiler gradient waveform. The method reads MRI data from each encoding step during an MRI sequence. The MRI sequence inserts a spiral-in gradient before a first refocusing RF pulse from the RF sequence, overlaps a pre-winder lobe for the encoding trajectory with the spoiler gradient waveform having the partition encoding waveforms added therein, and overlaps a rewinder lobe for the encoding trajectory with the spoiler gradient waveform having the partition encoding waveforms subtracted there from.

In one embodiment, a computer implemented method of gathering three-dimensional (3D) magnetic resonance imaging (MRI) data using spiral-in-out encoding trajectories from a k-space encoding orientation and a spoiler gradient direction and includes using a computer having a processor and computer memory to implement steps of calculating a variable flip angle radio frequency (RF) series for use as refocusing pulses, wherein the RF series comprises a plurality of refocusing RF pulses; applying a spoiler gradient waveform along the spoiler gradient direction, wherein the computer alternately adds and subtracts partition encoding waveforms to the spoiler gradient waveform; reading MRI data with the computer for each encoding step associated with the k-space encoding orientation during an MRI sequence that further includes inserting a spiral-in gradient before a first refocusing RF pulse from the RF sequence; overlapping a prewinder lobe for the encoding trajectory with the spoiler gradient waveform having the partition encoding waveforms added therein; and overlapping a rewinder lobe for the encoding trajectory with the spoiler gradient waveform having the partition encoding waveforms subtracted there from.

In another embodiment, the computer implemented method further repeats the MRI sequence for a selected number of total partition encodings to obtain data for a 3D MRI acquisition.

In another embodiment, the computer implemented method includes calculating the RF series comprises identifying a target signal curve having an asymptotic pseudo-steady state stabilization.

In another embodiment, The computer implemented method includes identifying the variable flip angle radio frequency (RF) series to meet the target signal curve and selected parameters for the MRI sequence.

In another embodiment, the computer implemented method includes the selected parameters being selected from the group consisting of field of view, echo spacing, effective TE, readout time, a target number of shots during the MRI sequence, a total number of echoes per shot, an acceleration ratio, a spatial resolution, a k-space center location relative to a selected number of total partition encodings, or a target signal-to-noise ratio.

In another embodiment, the computer implemented method includes each of the refocusing pulses corresponding to a respective variable flip angle used in the MRI sequence.

In another embodiment, the computer implemented method includes using the MRI sequence to extend a useable duration of an echo train by increasing the refocusing flip angles to slow signal decay due to T2 relaxation.

In another embodiment, the computer implemented method includes applying the MRI sequence at a low static magnetic-field strength.

In another embodiment, the computer implemented method includes the low static magnetic-field strength is less than or equal to 1 Tesla.

In another embodiment, the computer implemented method includes applying the MRI sequence at a medium static magnetic-field strength greater than 1 Tesla and less than or equal to 3 Tesla.

In another embodiment, the computer implemented method includes applying the MRI sequence at a static magnetic-field strength greater than 3 Tesla.

In another embodiment, the computer implemented method uses a turbo-spin-echo imaging sequence.

In another embodiment, the computer implemented method includes the spiral-in-out encoding trajectories having either constant density spirals or variable density spirals. In another embodiment, the computer implemented method includes reading the MRI data with a time symmetric spiral-in-out sampling scheme.

In another embodiment, the computer implemented method includes forming an MRI output by fully sampling the MRI data or by under-sampling the MRI data.

In another embodiment, the computer implemented method includes accelerating the reading of MRI data by utilizing parallel imaging and/or compressed sensing techniques, wherein the parallel imaging comprises 1D or 2D acceleration.

In another embodiment, the computer implemented method includes applying trajectory correction to the MRI data.

In another embodiment, the computer implemented method includes the trajectory correction in the form of a gradient impulse response function (GIRF).

In another embodiment, the computer implemented method includes applying sequence-based concomitant field compensation.

In another embodiment, the computer implemented method includes applying echo re-ordering to the MRI data prior to image reconstruction.

In another embodiment, the computer implemented method includes echo re-ordering by reversing an echo order during a measurement.

In another embodiment, the computer implemented method includes signal averaging that is normalized based on a simulated signal decay from the RF-series calculation and relaxation parameters.

In another embodiment, the computer implemented method includes that the MRI sequence is conducted pursuant to turbo-spin-echo imaging sequences according to the method Sampling Perfection with Application optimized Contrasts using different flip angle Evolutions (TSE-SPACE).

In another embodiment, the computer implemented method includes reading the MRI data from about 100 to about 250 echoes for each echo train.

In another embodiment, the computer implemented method includes reading the MRI data with echo spacing between about 3 ms and 4 ms, inclusive.

In another embodiment, the computer implemented method includes the refocusing RF pulses being spatially non-selective.

In another embodiment, the computer implemented method includes refocusing RF pulses corresponding to flip angles between about 30 degrees to 120 degrees, inclusive.

In another embodiment, the computer implemented method further includes partial Fourier imaging with zero-interpolation filling to reduce imaging time.

In another embodiment, the computer implemented method further includes applying k-space encoding trajectories with sampling in both in-plane and through-slab phase-encode directions.

In another embodiment, the computer implemented method includes using the MRI sequence to create T1-weighted, T2-weighted, PD-weighted, or FLAIR images.

In another embodiment, the computer implemented method includes the k-space encoding orientation having two imaging directions that are different from the spoiler gradient direction.

In another embodiment, the computer implemented method calculates the variable flip angle radio frequency (RF) series by calculating an extended phase graph (EPG) to identify a target signal curve, and matching the variable flip angle RF series to the target signal curve.

In another embodiment, a computerized system for gathering three-dimensional (3D) magnetic resonance imaging (MRI) data using spiral-in-out encoding trajectories from a k-space encoding orientation and a spoiler gradient direction includes a source of a magnetic gradient connected to a computer having a processor and computer memory to implement steps including calculating a variable flip angle radio frequency (RF) series for use as refocusing pulses, wherein the RF series comprises a plurality of refocusing RF pulses; applying a spoiler gradient waveform along the spoiler gradient direction, wherein the computer alternately adds and subtracts partition encoding waveforms to the spoiler gradient waveform; reading MRI data with the computer for each encoding step associated with the k-space encoding orientation during an MRI sequence further comprising: inserting a spiral-in gradient before a first refocusing RF pulse from the RF sequence; overlapping a prewinder lobe for the encoding trajectory with the spoiler gradient waveform having the partition encoding waveforms added therein; and overlapping a rewinder lobe for the encoding trajectory with the spoiler gradient waveform having the partition encoding waveforms subtracted there from.

BRIEF DESCRIPTION OF THE DRAWINGS

Reference will now be made to the accompanying drawings, which are not necessarily drawn to scale.

FIG. 2A shows reconstructed images of a sagittal slice in a resolution phantom demonstrating the performance of Maxwell compensation and trajectory correction on image quality (scan time: 2:27 min). The image is from spiral SPACE without any compensation.

FIG. 2B shows reconstructed images of a sagittal slice in a resolution phantom demonstrating the performance of Maxwell compensation and trajectory correction on image quality (scan time: 2:27 min). The image is with Maxwell compensation only.

FIG. 2C shows an image with Maxwell compensation and trajectory correction using anisotropic delay model.

FIG. 2D shows an image with Maxwell compensation and trajectory correction using a GIRF model. Geometric distortion shown in images due to gradient nonlinearity could be corrected using standard remapping methods.

FIG. 5 illustrates a table of possible sequence parameters for Spiral SPACE and Cartesian SPACE at 0.55 T.

FIG. 6A shows a comparison of two sets of variable-flip-angles.

FIG. 6B shows corresponding signal pathways of gray matter (GM) according to the variable flip angles of FIG. 6A;

FIG. 6C shows fully sampled in vivo images version 1.

FIG. 6D shows fully sampled in vivo images from version 2). SNR of spiral SPACE from version 1 versus that from version 2: ROI 1 (13.4 vs. 11.1), ROI 2 (8.7 vs. 6.3) (This is nominal SNR).

DETAILED DESCRIPTION

Figure 1A:
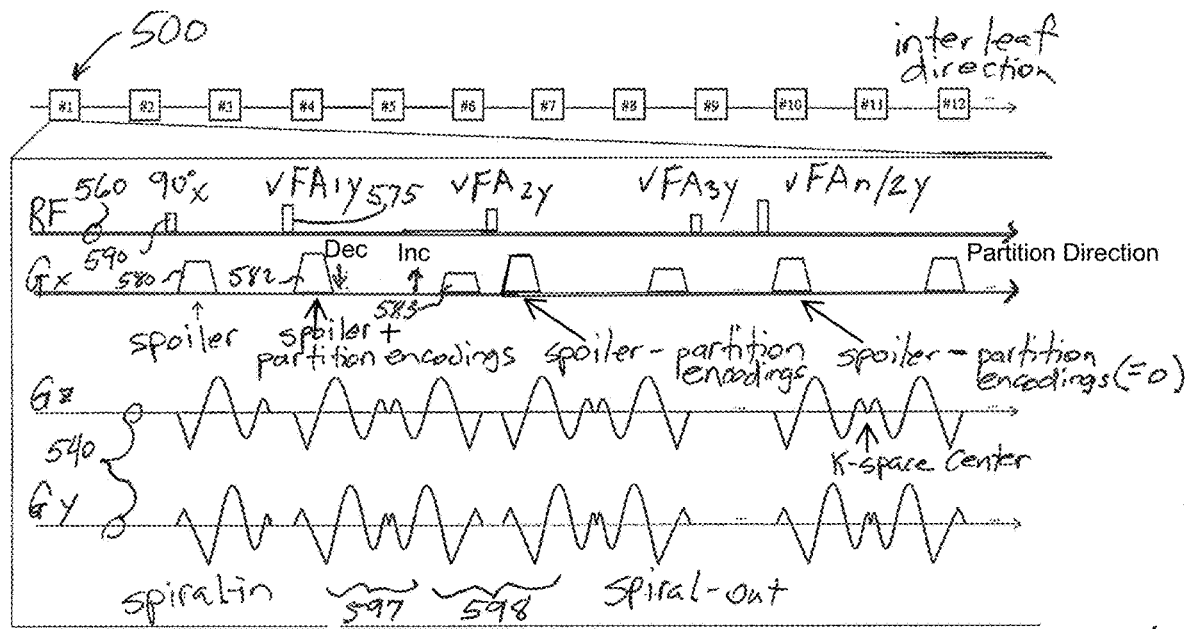
FIG. 1A shows a pulse sequence timing diagram including spiral-in gradients for Maxwell compensation before the first refocusing RF pulse, constant-density spiral-in/out readouts for data acquisition, and linearly decreasing partition blips combined with spoiler gradients for Kz encodings. Note that the inner loop is for partition lines while the outer loop is for rotated spiral arms. Sagittal orientation was used for all imaging methods.

Although example embodiments of the disclosed technology are explained in detail herein, it is to be understood that other embodiments are contemplated. Accordingly, it is not intended that the disclosed technology be limited in its scope to the details of construction and arrangement of components set forth in the following description or illustrated in the drawings. The disclosed technology is capable of other embodiments and of being practiced or carried out in various ways.

It must also be noted that, as used in the specification and the appended claims, the singular forms "a," "an" and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the disclosed technology. Similarly, it is also to be understood that the mention of one or more components in a device or system does not preclude the presence of additional components or intervening components between those components expressly identified.

As discussed herein, a "subject" (or "patient") may be any applicable human, animal, or other organism, living or dead, or other biological or molecular structure or chemical environment, and may relate to particular components of the subject, for instance specific organs, tissues, or fluids of a subject, may be in a particular location of the subject, referred to herein as an "area of interest" or a "region of interest."

Some references, which may include various patents, patent applications, and publications, are cited in a reference list and discussed in the disclosure provided herein. The citation and/or discussion of such references is provided merely to clarify the description of the disclosed technology and is not an admission that any such reference is "prior art" to any aspects of the disclosed technology described herein. In terms of notation, "[n]" corresponds to the nth reference in the list. All references cited and discussed in this specification are incorporated herein by reference in their entireties and to the same extent as if each reference was individually incorporated by reference.

In the following description, references are made to the accompanying drawings that form a part hereof and that show, by way of illustration, specific embodiments or examples. In referring to the drawings, like numerals represent like elements throughout the several figures.

Figure 7:
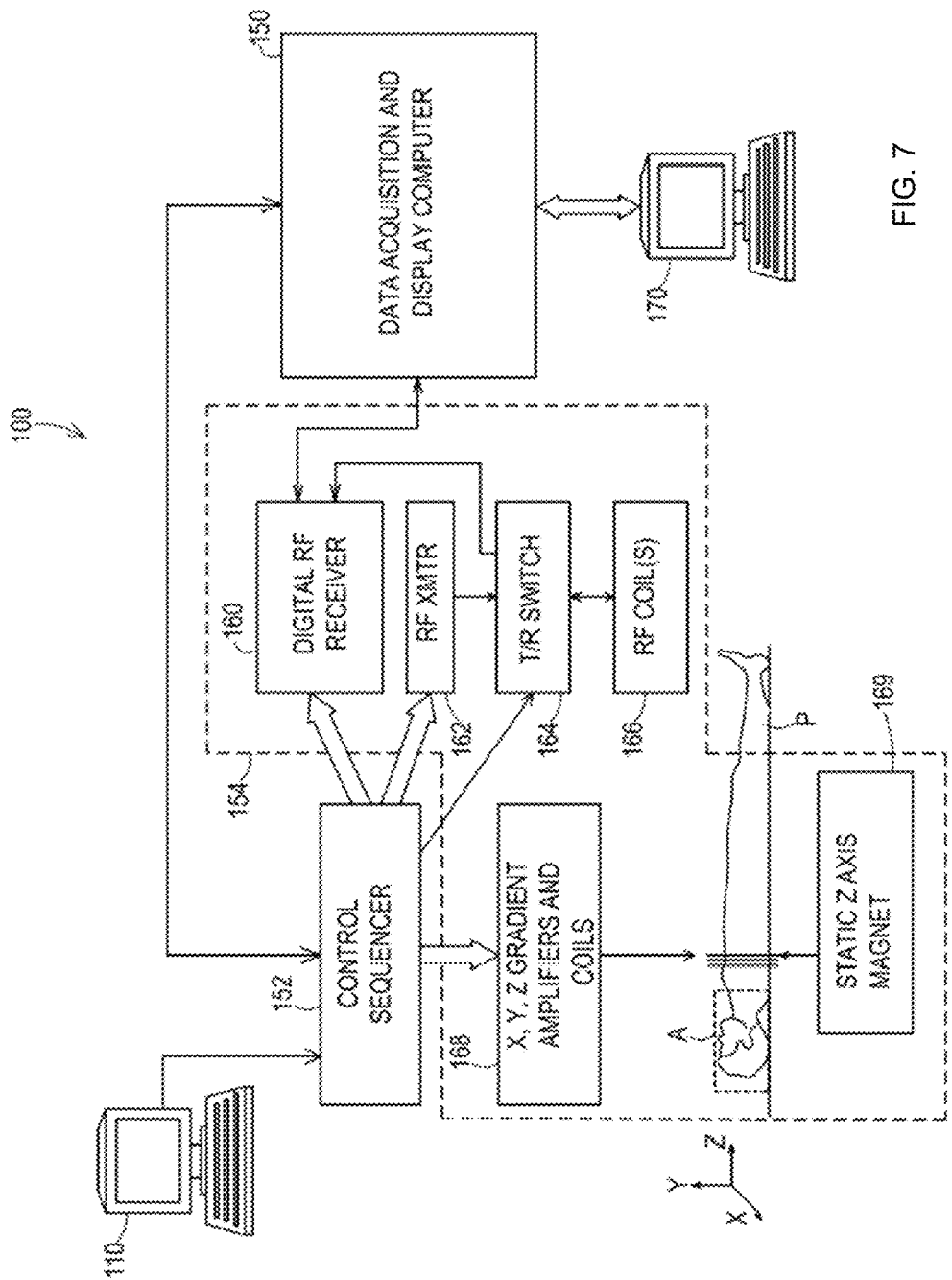
FIG. 7 is a schematic of a computer environment used in accordance with the disclosure herein.

FIG. 7 is a system diagram illustrating an operating environment capable of implementing aspects of the present disclosure in accordance with one or more example embodiments. FIG. 7 illustrates an example of a magnetic resonance imaging (MRI) system 100, including a data acquisition and display computer 150 coupled to an operator console 110, an MRI real-time control sequencer 152, and an MRI subsystem 154. The MRI subsystem 154 may include XYZ magnetic gradient coils and associated amplifiers 168, a static Z-axis magnet 169, a digital RF transmitter 162, a digital RF receiver 160, a transmit/receive switch 164, and RF coil(s) 166. The MRI subsystem 154 may be controlled in real time by control sequencer 152 to generate magnetic and radio frequency fields that stimulate magnetic resonance phenomena in a living subject, patient P, to be imaged. A contrast-enhanced image of an area of interest A of the patient P may be shown on display 158. The display 158 may be implemented through a variety of output interfaces, including a monitor, printer, or data storage.

The area of interest "A" corresponds to a region associated with one or more physiological activities in patient "P". The area of interest shown in the example embodiment of FIG. 1 corresponds to a chest region of patient "P", but the area of interest for purposes of implementing aspects of the disclosure presented herein is not limited to the chest area. It should be recognized and appreciated that the area of interest can be one or more of a brain region, heart region, and upper or lower limb regions of the patient "P", for example.

It should be appreciated that any number and type of computer-based medical imaging systems or components, including various types of commercially available medical imaging systems and components, may be used to practice certain aspects of the present disclosure. Systems as described herein with respect to example embodiments are not intended to be specifically limited to magnetic resonance imaging (MRI) implementations or the particular system shown in FIG. 7.

One or more data acquisition or data collection steps as described herein in accordance with one or more embodiments may include acquiring, collecting, receiving, or otherwise obtaining data such as imaging data corresponding to an area of interest. By way of example, data acquisition or collection may include acquiring data via a data acquisition device, receiving data from an on-site or off-site data acquisition device or from another data collection, storage, or processing device. Similarly, data acquisition or data collection devices of a system in accordance with one or more embodiments of the present disclosure may include any device configured to acquire, collect, or otherwise obtain data, or to receive data from a data acquisition device within the system, an independent data acquisition device located on-site or off-site, or another data collection, storage, or processing device.

Figure 8:
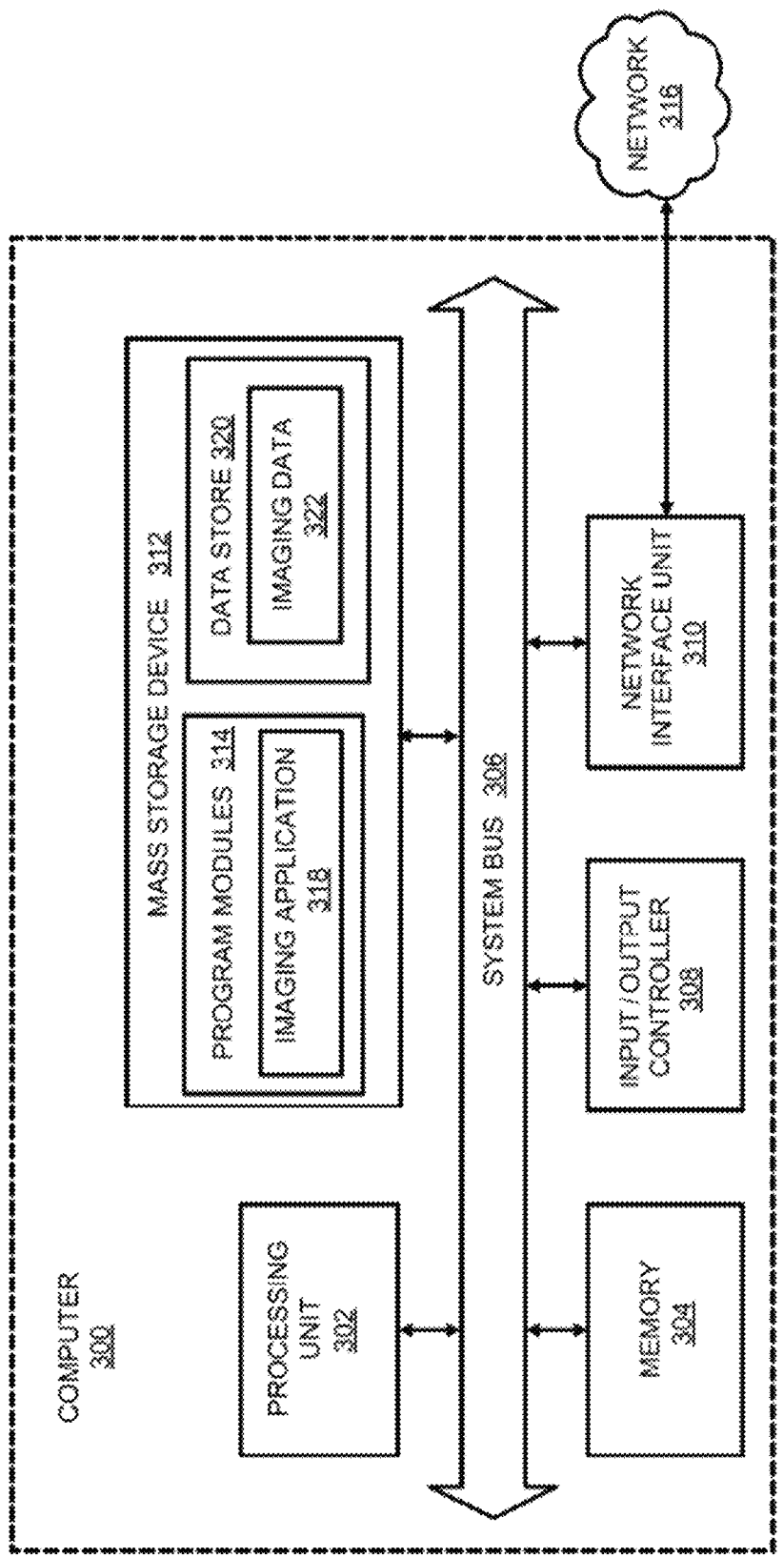
FIG. 8 is a schematic of a computer environment used in accordance with the disclosure herein.

FIG. 8 is a computer architecture diagram showing a general computing system capable of implementing aspects of the present disclosure in accordance with one or more embodiments described herein. A computer 200 may be configured to perform one or more functions associated with embodiments of this disclosure. For example, the computer 200 may be configured to perform operations of the method as described below. It should be appreciated that the computer 200 may be implemented within a single computing device or a computing system formed with multiple connected computing devices. The computer 200 may be configured to perform various distributed computing tasks, which may distribute processing and/or storage resources among the multiple devices. The data acquisition and display computer 150 and/or operator console 110 of the system shown in FIG. 1 may include one or more systems and components of the computer 200.

As shown, the computer 200 includes a processing unit 202 ("CPU"), a system memory 204, and a system bus 206 that couples the memory 204 to the CPU 202. The computer 200 further includes a mass storage device 212 for storing program modules 214. The program modules 214 may be operable to perform one or more functions associated with embodiments of method as illustrated in one or more of the figures of this disclosure, for example to cause the computer 200 to perform operations of the automated DENSE analysis as described below. The program modules 214 may include an imaging application 218 for performing data acquisition functions as described herein, for example to receive image data corresponding to magnetic resonance imaging of an area of interest. The computer 200 can include a data store 220 for storing data that may include imaging-related data 222 such as acquired image data, and a modeling data store 224 for storing image modeling data, or other various types of data utilized in practicing aspects of the present disclosure.

The mass storage device 212 is connected to the CPU 202 through a mass storage controller (not shown) connected to the bus 206. The mass storage device 212 and its associated computer-storage media provide non-volatile storage for the computer 200. Although the description of computer-storage media contained herein refers to a mass storage device, such as a hard disk or CD-ROM drive, it should be appreciated by those skilled in the art that computer-storage media can be any available computer storage media that can be accessed by the computer 200.

By way of example, and not limitation, computer-storage media (also referred to herein as a "computer-readable storage medium" or "computer-readable storage media") may include volatile and non-volatile, removable and non-removable media implemented in any method or technology for storage of information such as computer-storage instructions, data structures, program modules, or other data. For example, computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 200. Transitory signals are not "computer-storage media", "computer-readable storage medium" or "computer-readable storage media" as described herein.

According to various embodiments, the computer 200 may operate in a networked environment using connections to other local or remote computers through a network 216 via a network interface unit 210 connected to the bus 206. The network interface unit 210 may facilitate connection of the computing device inputs and outputs to one or more suitable networks and/or connections such as a local area network (LAN), a wide area network (WAN), the Internet, a cellular network, a radio frequency network, a Bluetooth-enabled network, a Wi-Fi enabled network, a satellite-based network, or other wired and/or wireless networks for communication with external devices and/or systems. The computer 200 may also include an input/output controller 208 for receiving and processing input from a number of input devices. Input devices may include one or more of keyboards, mice, stylus, touchscreens, microphones, audio capturing devices, or image/video capturing devices. An end user may utilize such input devices to interact with a user interface, for example a graphical user interface, for managing various functions performed by the computer 200.

The bus 206 may enable the processing unit 202 to read code and/or data to/from the mass storage device 212 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state or may include rotating media storing magnetically-encoded information. The program modules 214, which include the imaging application 218, may include instructions that, when loaded into the processing unit 202 and executed, cause the computer 200 to provide functions associated with embodiments illustrated herein. The program modules 214 may also provide various tools or techniques by which the computer 200 may participate within the overall systems or operating environments using the components, flows, and data structures discussed throughout this description.

In general, the program modules 214 may, when loaded into the processing unit 202 and executed, transform the processing unit 202 and the overall computer 200 from a general-purpose computing system into a special-purpose computing system. The processing unit 202 may be constructed from any number of transistors or other discrete circuit elements, which may individually or collectively assume any number of states. More specifically, the processing unit 202 may operate as a finite-state machine, in response to executable instructions contained within the program modules 214. These computer-executable instructions may transform the processing unit 202 by specifying how the processing unit 202 transitions between states, thereby transforming the transistors or other discrete hardware elements constituting the processing unit 202.

Encoding the program modules 214 may also transform the physical structure of the computer-storage media. The specific transformation of physical structure may depend on various factors, in different implementations of this description. Examples of such factors may include but are not limited to the technology used to implement the computer-storage media, whether the computer storage media are characterized as primary or secondary storage, and the like. For example, if the computer-storage media are implemented as semiconductor-based memory, the program modules 214 may transform the physical state of the semiconductor memory, when the software is encoded therein. For example, the program modules 214 may transform the state of transistors, capacitors, or other discrete circuit elements constituting the semiconductor memory.

As another example, the computer-storage media may be implemented using magnetic or optical technology. In such implementations, the program modules 214 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

The computing system can include clients and servers. A client and server are generally remote from each other and generally interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine 300) and software architectures that can be deployed in example embodiments.

Figure 9:
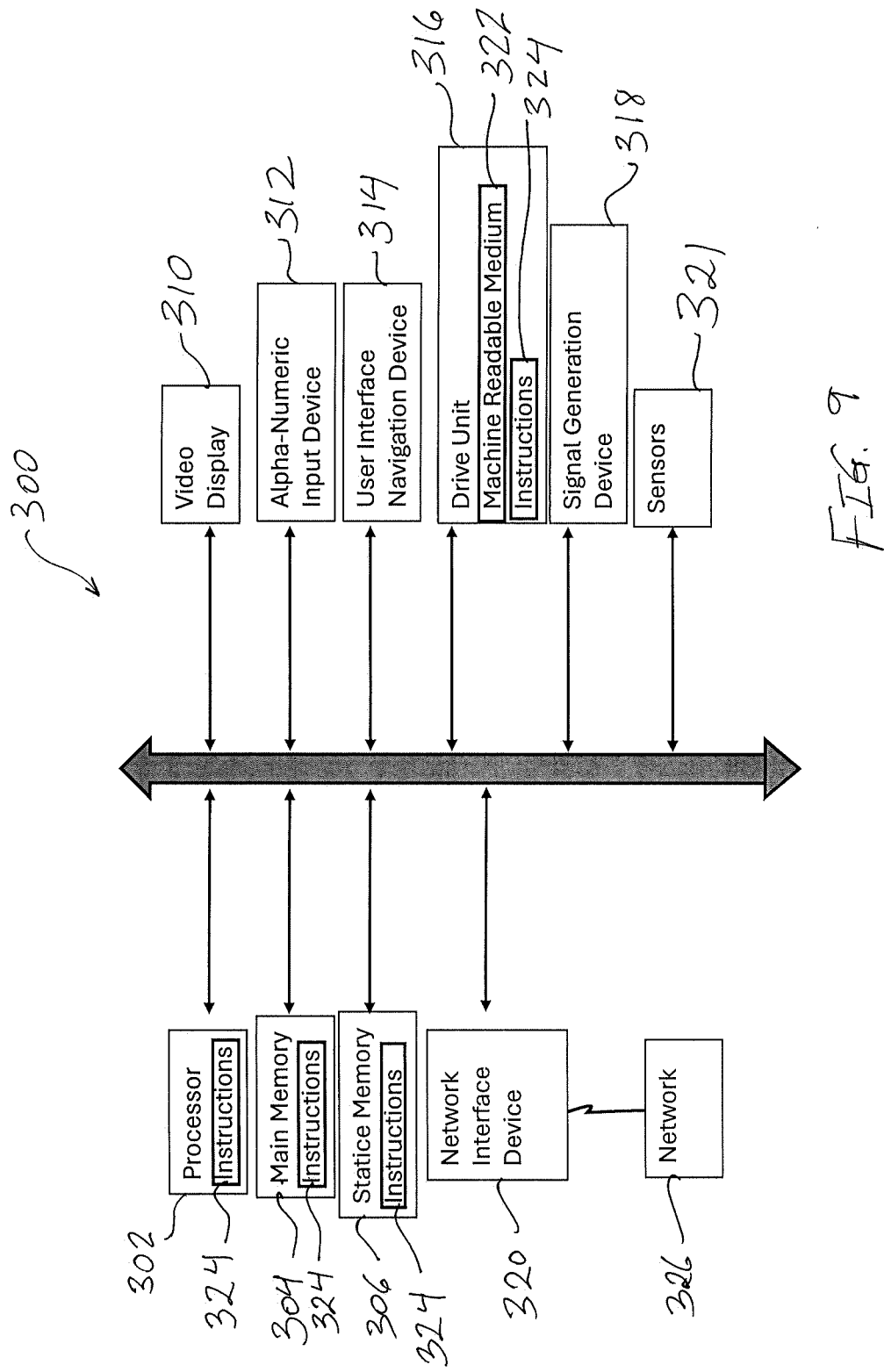
FIG. 9 is a schematic of a computer environment used in accordance with the disclosure herein.

The machine 300 of FIG. 9 can operate as a standalone device or the machine 300 can be connected (e.g., networked) to other machines. In a networked deployment, the machine 300 can operate in the capacity of either a server or a client machine in server-client network environments. In an example, machine 300 can act as a peer machine in peer-to-peer (or other distributed) network environments. The machine 300 can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) specifying actions to be taken (e.g., performed) by the machine 300. Further, while only a single machine 300 is illustrated, the term "machine" shall also be taken to include any collection of machines that individually or jointly execute a set (or multiple sets) of instructions to perform any one or more of the methodologies discussed herein.

Example machine (e.g., computer system) 300 can include a processor 302 (e.g., a central processing unit (CPU), a graphics processing unit (GPU) or both), a main memory 304 and a static memory 306, some or all of which can communicate with each other via a bus 308. The machine 300 can further include a display unit 310, an alphanumeric input device 312 (e.g., a keyboard), and a user interface (UI) navigation device 311 (e.g., a mouse). In an example, the display unit 810, input device 317 and UI navigation device 314 can be a touch screen display. The machine 300 can additionally include a storage device (e.g., drive unit) 316, a signal generation device 318 (e.g., a speaker), a network interface device 320, and one or more sensors 321, such as a global positioning system (GPS) sensor, compass, accelerometer, or other sensor. The storage device 316 can include a machine readable medium 322 on which is stored one or more sets of data structures or instructions 324 (e.g., software) embodying or utilized by any one or more of the methodologies or functions described herein. The instructions 324 can also reside, completely or at least partially, within the main memory 304, within static memory 306, or within the processor 302 during execution thereof by the machine 300. In an example, one or any combination of the processor 302, the main memory 304, the static memory 306, or the storage device 316 can constitute machine readable media. While the machine readable medium 322 is illustrated as a single medium, the term "machine readable medium" can include a single medium or multiple media (e.g., a centralized or distributed database, and/or associated caches and servers) that configured to store the one or more instructions 324. The term "machine readable medium" can also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine readable medium" can accordingly be taken to include, but not be limited to, solid-state memories, and optical and magnetic media.

Specific examples of machine readable media can include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magnetooptical disks; and CD-ROM and DVD-ROM disks. The instructions 324 can further be transmitted or received over a communications network 326 using a transmission medium via the network interface device 320 utilizing any one of a number of transfer protocols (e.g., frame relay, IP, TCP, UDP, HTTP, etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 standards family known as Wi-Fi®, IEEE 802.16 standards family known as WiMax®), peer-to-peer (P2P) networks, among others. The term "transmission medium" shall be taken to include any intangible medium that is capable of storing, encoding or carrying instructions for execution by the machine, and includes digital or analog communications signals or other intangible medium to facilitate communication of such software.

Three-dimensional (3D) single-slab turbo-spin-echo imaging [1-3], also known as its commercial name "SPACE" (Siemens Healthcare) or "CUBE" (GE Healthcare) or "VISTA" (Philips Healthcare), uses very long echo trains to increase the scan efficiency by varying the flip angles of the refocusing RF pulses for T2-weighted imaging in a variety of applications, such as neuro, spine, and musculoskeletal imaging. The 3D acquisition presents several advantages over 2D imaging, with the primary benefit being the ability to retrospectively reformat the corresponding datasets for viewing in any arbitrary orientations. However, the conventional Cartesian sampling remains time consuming because of its relatively inefficient k-space coverage when prescribing high-isotropic spatial resolution. This problem becomes worse at low-field systems compared to the mid- or high-field systems, due to the inherently lower SNR [4], which requires several signal averages to maintain clinically acceptable image quality and thus increases the total scan time by at least double.

Spiral acquisitions cover k-space more efficiently than the conventional Cartesian counterpart, providing a means for reduced scan time or improved SNR within a fixed scan time. [5,6]. Recently, spiral imaging is more attractive at low fields, where improved field homogeneity enables imaging with prolonged readouts to regain SNR. [7-9]. However, the presence of concomitant magnetic-fields (also referred to Maxwell fields) at low-field systems may affect the signal pathway in TSE-based acquisitions, especially when using high amplitude gradient waveforms and/or time-varying spiral readouts where the phase error induced by concomitant gradients varies along the echo train. [8-10]. In order to maintain the Carr-Purcell-Meiboom-Gill (CPMG) condition, sequence-based compensation was proposed for correcting echo-to-echo phase variations by adding bipolar gradients in each echo spacing (ESP). However, this approach will inevitably increase the ESP by several milliseconds, which may not be suitable for 3D TSE imaging, as it may result in a high occupancy of the non-sampling period due to its relatively short ESP (~10 ms), compared to the one used in 2D TSE imaging (~30 ms) at 0.55 T.

In this work, the disclosure developed a 3D TSE method using interleaved, rotated spiral-in/out readouts, incorporating a variable-flip-angle approach with echo-reordering to shape the signal evolution, and parallel imaging/compressed sensing to further accelerate the data acquisition at 0.55 T. Additionally, the work included gradient infidelity correction, along with sequence modifications and image reconstruction methods to compensate for the concomitant gradient effects among the echoes and during the acquisition window. Finally, the disclosure validated the feasibility of the proposed method and compared the performance to Cartesian SPACE in both phantom and in vivo scans.

The disclosure concerns Fast ("Turbo") Spin Echo techniques, commonly called "FSE" or "TSE" among the MRI community, for isotropic 3D imaging. TSE techniques have already shown to be of value in a wide range of clinical applications, such as high-resolution, contiguous, thin-section images for complex anatomy (e.g., brain, inner ear, joints), and as a replacement for several 2D acquisitions (spine, pelvis). The disclosure also can be used in situations not necessarily involving biomedical applications, such as for analyzing structural aspects of materials, quality assurance in precision manufacturing, and machine vision.

For purposes of this disclosure, the following technical definitions will apply, without limiting the disclosure:

A "voxel" is the fundamental unit of space within a 3D Cartesian grid (analogous to a "pixel" in a 2D grid).

The term "isotropic" means that the voxels are a cube of uniform dimensions, say 0.1 mm×0.1 mm×0.1 mm, allowing the images to be reformatted in any viewer-direction with equal resolution.

"T1-weighted" and "T2-weighted" refer to the type of magnetic degeneration following an MRI pulse: T1 is the primary relaxation of the nucleus from the pulse direction to the main longitudinal field, while T2 refers to decay of the transverse component of net magnetization (also known as spin-spin relaxation).

"PD-weighted" refers to the weighting based on proton density.

A "FLAIR" image ("Fluid Attenuated Inversion Recovery") is a sequence similar to a T2-weighted image, except that the Time to Repetition ("TR", the time between successive pulses applied to the same slice) and Time to Echo ("TE", time between delivery of the pulse and receipt of the echo signal) are very long by comparison.

SPACE, an acronym for "Sampling Perfection with Application optimized Contrasts using different flip angle Evolution," is the name for the TSE version offered specifically by Siemens Medical, which has special modifications optimizing. Some other platforms are called as follows:
- CUBE® is the GE brand name of their sequence (not an acronym);
- VISTA® is the Philips name, an abbreviation for "Volume Isotropic Turbo spin echo Acquisition";
- Hitachi's brand name is isoFSE®;
- Canon calls their platform 3D MVOX® (for "Multi-VOXel").

This disclosure can be applied in a platform-independent manner wherever TSEs share the following common elements:
- Very long echo train lengths, typically 100-250 echoes;
- Ultrashort echo spacing, typically 3-4 msec;
- Non-selective refocusing pulses.

Methods

Pulse Sequence Design

A simplified timing diagram of the sequence for a sagittal slice orientation is shown in FIG. 1A. Note that the sagittal orientation (Ky-Kz) was used for all imaging in the following work. The inner loop incremented the partition encodings (Kx) along the echo direction. An encoding orientation may include encoding the k-space in two different directions (e.g., along an x and y axis) that is different from a slice selection gradient that is transverse to the axes. Spiral interleaves were rotated in the outer loop, where each excitation acquired a single spiral-in/out arm for every 3D partition encoding, to keep the same concomitant gradient fields induced by the identical spiral arm among echoes. Thus, there was no need for additional bipolars inserted into each ESP to maintain the CPMG condition as used in 2D spiral TSE imaging. To further improve the scan efficiency (readout: 4.48 ms, ESP: 7.2 ms), sequence modifications included:

Non-spatially selective refocusing RF pulses were used for the whole brain excitation.

Spoiler gradients (approximately 4π dephasing) were combined with 3D partition encodings.

Spiral-in/out prewinder and rewinder lobes were played simultaneously with the preceding Gx gradient (spoiler gradient plus the current partition encoding gradient) and the following Gx gradient (spoiler gradient minus the current partition encoding gradient) along the partition direction.

Constant density and variable density spirals were used for fully sampled datasets, and 2×-accelerated under-sampled datasets, respectively.

As described in Refs. [8, 9], encoding gradients with variable amplitudes along the echo train will produce unbalanced concomitant fields that need to be corrected via sequence modifications first. To reduce the self-squared Maxwell terms, the following two steps included:

Gradient de-rating was used for partition encodings.

Spiral-in gradients (the first half of the following spiral-in/out readout) were added in the interval between the excitation pulse and the first refocusing pulse, as shown in the orange box.

The utility of the added preceding spiral-in gradients is to not only compensate the self-squared terms for the current spiral-in/out interleaf but also self-balance the quadratic cross-terms induced by using the same overlapping strategy for the spiral-in prewinder lobes and Gx (spoiler gradients combined with partition encodings) gradients. No additional time was needed for additional concomitant field compensation (e.g., added bipolar gradients), resulting in no sacrifice in scan efficiency.

Variable-Flip-Angle Generation and the Contrast-Equivalent TE

Figure 1B:
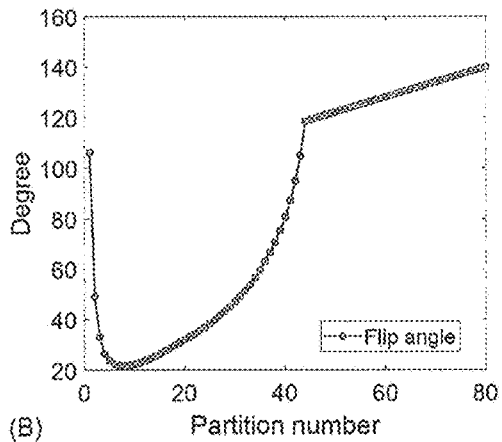
FIG. 1B shows a variable-flip-angle RF series generated for 80 partition lines following one excitation.
Figure 1C:
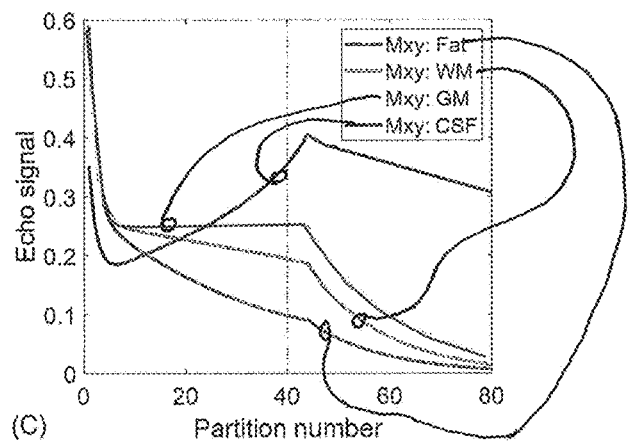
FIG. 1C shows signal pathways of fat, white matter, gray matter, and CSF calculated using an extended phase graph (EPG) algorithm.

In this work, a prescribed signal evolution based on asymptotic target pseudo-steady-state stabilization, as described in Ref 3, was firstly determined for gray matter (GM) specifically at 0.55 T ($T_1$=800 ms, $T_2$=110 ms). The prospective EPG algorithm was then utilized for the calculation of the variable-flip-angle RF series that meet this target signal curve and the sequence parameters (e.g., ESP, the portion of the flat plateau), as shown in FIG. 1B. The term effective TE ($TE_{eff}$) used in this work refers to the echo time where the k-space center is acquired, while the contrast-equivalent TE ($TE_{equiv}$) at the kth echo as the k-space center can be determined by the Equation 1 given below[3]:

$$TE_{equiv}(k) = -T_2 \ln\left(\frac{s(k)}{s_{coh}(k)}\right) \quad (1)$$

where s and $s_{coh}$ are the normalized signal intensity with and without relaxation effects at each echo, respectively. $T_2$ is the transverse relaxation time of the current tissue. FIG. 1C shows the equivalent TE at different echoes, where the central line of 3D partition encodings was sampled. In this work, the total number of echoes per shot was designed to be 80, and the k-space center was placed at the middle of the echo train (n=40), thus resulting in an estimated contrast equivalent to a TE of 111 ms with conventional spin-echo imaging. Two shots covered the whole partition lines (n=160), while the number of spiral-in/out arms was set to 54, thus resulting in a total of 54×2=108 shots for a fully sampled 3D stack-of-spiral k-space.

Trajectory Correction

Gradient impulse response function (GIRF) is a means to characterize the gradient distortions, such as gradient delays, eddy current, and field oscillations, and has been used to predict the actual k-space trajectories by incorporating the pre-calculated GIRF files (x, y, and z axes) into the theoretical trajectories. The calibration was performed in a spherical phantom separately and can be used for future scans with arbitrary orientation planes. To demonstrate the performance of this method on spiral imaging, the disclosure compared the phantom images reconstructed from thermotical trajectories, trajectories with anisotropic delay correction, and trajectories with GIRF correction.

Image Reconstruction

All images were reconstructed offline in MATLAB. The 2D NUFFT code was used for fully sampled non-Cartesian image reconstruction, and L1-ESPIRiT13 was utilized for under-sampled datasets. Residual phase errors from concomitant gradients during the readout were corrected by a fast conjugate phase reconstruction method based on a Chebyshev approximation.

Echo Reordering and Signal Normalization

Images reconstructed directly from the raw data may show certain image blurriness, due to the lowpass k-space filter induced by the variable-flip-angle scheme with the 3D-partition-encoding along the echo train. Echo reordering (also called double encoding), which was originally proposed for 2D interleaved, rotated spiral TSE, improves the performance on the swirl-like artifacts reduction induced by the strong signal variation along the echo train. [12]. In this work, echo-reordering was applied whereby the echo order was reversed during the second measurement, and data after signal averaging was further normalized based on a simulated signal decay from EPG and relaxation parameters of GM.

MRI Experiments

Experiments were performed on a ramped-down 0.55 T MR scanner (prototype MAGNETOM Aera, Siemens Healthcare, Erlangen, Germany) using a 16-channel head/neck coil. For both phantom and healthy volunteer studies (n=3), images were acquired using spiral SPACE with and without compensation, with Cartesian SPACE as a reference. Both fully sampled and 2× under-sampled datasets were collected sequentially. GRAPPA and partial Fourier [7,8] reconstruction were utilized for under-sampled Cartesian SPACE. FOV was set to 250×250 mm² with 160 mm slab thickness, which results in 1 mm³ isotropic whole brain T2-weighted images. Other sequence parameters can be found in Table S1.

Image Quality Analysis

The evaluation of spiral SPACE after full compensation and the standard Cartesian SPACE sequence was performed quantitatively on in vivo data. SNR measurements were performed on fully sampled images only using pseudo-replica method [15], followed by multiplying the calculated SNR by the coefficient (1/(voxel size×√(scan time))) for spiral SPACE (0.996) and Cartesian TSE (1.0) to generate the SNR efficiency maps. Regions of interest (ROIs) were drawn in both white matter and gray matter on the SNR efficiency maps, and the averaged SNR was then obtained for each subject, with a total of selected ten slices per subject. Pairwise comparisons between these two imaging methods were performed using one-way ANOVA with the Tukey-Kramer post hoc test.

Results

Several strategies of sequence modifications were implemented in spiral SPACE for improved scan efficiency compared to the conventional Cartesian SPACE, such as using prolonged spiral-in/out trajectories and the gradient overlapping. Gradient infidelity was corrected using gradient impulse response function (GIRF), along with concomitant field compensation to correct for the unwanted phase errors over the echoes and during the readout windows. To maintain a long echo train (~ 600 ms) within one shot, a series of specific variable-flip-angle refocusing RF pulses were generated based on extended phase graph (EPG) and sequence parameters. An echo-ordering scheme was utilized to further smooth the signal pathway along the echo direction. Images from spiral SPACE with no compensation, with compensation, and Cartesian SPACE were compared via phantom and in vivo studies.

FIG. 1c shows the signal pathways for white matter (T1=500 ms, T2=90 ms), gray matter, fat (T1=180 ms, T2=95 ms), and cerebral spinal fluid (T1=2600 ms, T2=800 ms). Note that the fat signal is much lower than others, therefore additional fat saturation is not needed.

FIG. 2 illustrates the performance of the proposed sequence-based Maxwell compensation and trajectory correction in phantom studies. Signal loss can be seen at the top and bottom of FIG. 2A because of strong concomitant fields along the physical Z axis. After Maxwell compensation, FIG. 2B shows much improved image quality but still demonstrates edge artifacts and signal shading due to the trajectory infidelity. Applying trajectory correction using the GIRF method (FIG. 2D) yields better image quality than the anisotropic gradient delay model (FIG. 2C), as can be easily seen in zoomed regions.

Figure 3A:
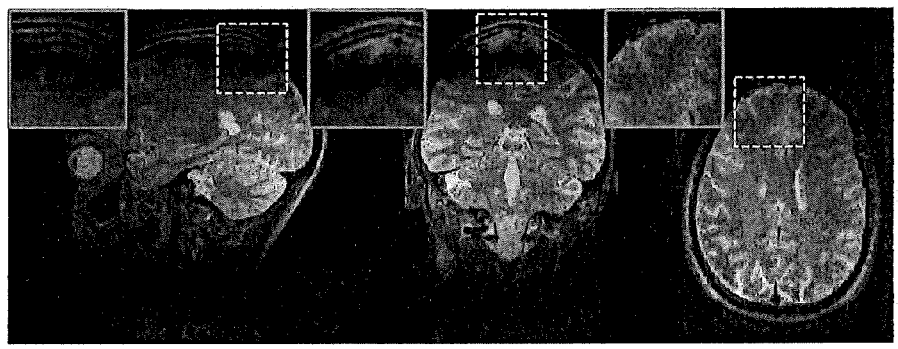
FIG. 3A shows a comparison of in vivo images using spiral SPACE with no Maxwell compensation (top).
Figure 3B:
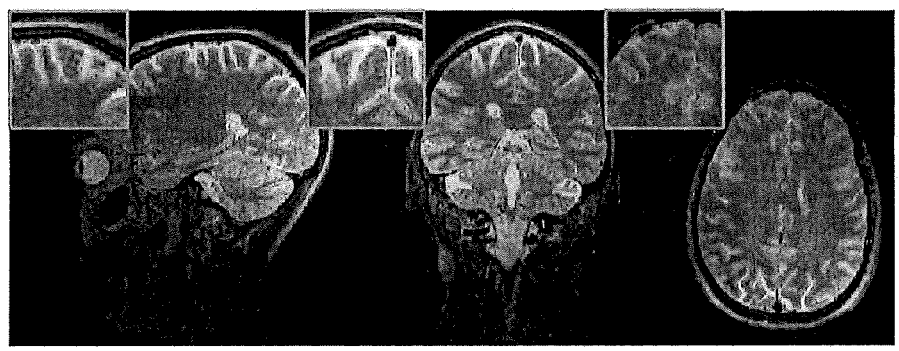
FIG. 3B shows a comparison of in vivo images using spiral SPACE with sequence-based Maxwell compensation (middle)
Figure 3C:
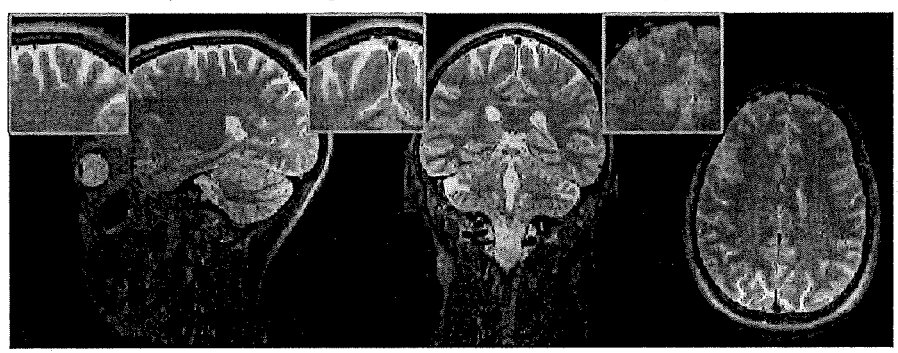
FIG. 3C shows a comparison of in vivo images using spiral SPACE with both sequence—and image reconstruction-based Maxwell compensation (bottom) (scan time: 9:43 min). It can be clearly seen that there is regional signal loss and artifacts at the top and bottom of sagittal and coronal slices where Maxwell gradients were strong, while there is global signal loss and blurring for axial slices when the slices were far away from isocenter (zoomed regions).

FIG. 3 shows brain images from spiral SPACE with no concomitant field compensation (top), with sequence-based concomitant field compensation (middle), or with full concomitant field compensation (sequence and reconstruction, bottom). Signal loss and blurring artifacts are substantially reduced when using sequence-based concomitant field compensation (zoomed regions), and the residual blurring artifacts accrued during the readout can be further mitigated through image reconstruction.

Figure 4A:
FIG. 4A shows a comparison of in vivo fully corrected images from another healthy volunteer using spiral SPACE (scan time: 9:43 min) without echo-reordering (top).
Figure 4B:
FIG. 4B shows a comparison of in vivo fully corrected images from another healthy volunteer using spiral SPACE with echo-reordering and signal normalization (middle).
Figure 4C:
FIG. 4C shows a comparison of in vivo fully corrected images from another healthy volunteer using Cartesian SPACE as the reference (bottom) (scan time: 9:39 min). The images at the top look slightly blurred due to the initial signal decay along the echo train, while those in the middle show improved sharpness with similar image quality compared to the Cartesian counterpart (zoomed regions).

FIG. 4 shows fully corrected spiral SPACE images without echo-reordering (top) and with echo-reordering (middle), compared to Cartesian SPACE images (bottom). Data after echo-reordering and averaging was further normalized based on a simulated signal decay using EPG, and the corresponding images show improved sharpness compared to those without echo-reordering.

FIG. 5 displays the images reconstructed with fully sampled (top, ~10 min scan time) and 2x-undersampled (bottom, ~5 minutes scan time) acquisitions by spiral SPACE (left) and Cartesian SPACE (right). SNR measurements/maps This work introduces an alternative approach to Cartesian SPACE for 1 mm³ isotropic whole brain T2-weighted imaging on a high performance 0.55 T scanner. In this technique, the Cartesian readouts are replaced by interleaved, rotated spiral-in-out trajectories, combined with a variable-flip-angle refocusing train, echo-reordering, and concomitant gradient compensation. Parallel imaging (PI) and compressed sensing (CS) are utilized for further acceleration. Compared to 3D-Cartesian SPACE, this method can be leveraged to mitigate the lower SNR of 0.55 T via the improved SNR efficiency of prolonged spiral trajectory sampling.

The variable-flip-angle RF series play a significant role in extending the useable duration of the echo train and maintaining the signal intensity by slowly increasing the refocusing flip angles to against the signal decay mostly due to the T2 relaxation. In this study, the disclosure generated two versions of variable-flip-angle series shown in Figure S1A, and the corresponding signal pathways of gray matter are shown in Figure S1B, of which the first has a higher signal amplitude around the central portion of the echo train while the latter has a flatter shape across the echo train. Figure S1C and S1D shows the in vivo images obtained from these two sets of RF series, respectively. It can be easily seen that image C has higher SNR over image D, mostly likely due to more signal energy acquired by echoes from the first variable-flip-angle version. The drawback of the first version compared to the second is it may induce image blurring because of a shorter signal plateau followed by a faster signal decay; however, the blurring can be mitigated by using echo-reordering and signal normalization as described before.

Concomitant gradient compensation is necessary for spiral TSE imaging to obtain high quality images with minimal artifacts. As shown in this work, at low field systems, using spiral gradient waveforms with a maximum amplitude of 25 mT/m and even a short (4.48 ms) readout time will still produce unwanted concomitant gradients that cause severe image degradation. Refs. [8, 9] have presented several general strategies of concomitant gradient compensation methods that can be applied to any type of spiral-based TSE acquisition. Based on that, this work describes a special case that uses time-symmetric spiral-in/out readouts in 3D TSE/SPACE. Because of the sampling scheme where in each echo train the spiral readout is the same, no additional bipolar gradients are needed to be inserted into each echo, permitting a short ESP with high scan efficiency. Furthermore, the symmetric property of the spiral-in/out readout enables equivalent concomitant compensation for both self-squared and quadratic-cross terms by simply placing the spiral-in arms (the first half of spiral-in/out arms) into the interval between the excitation pulse and the first refocusing pulse, which in turn allows gradient overlapping to further increase the scan efficiency, regardless of the induced non-zero cross-term concomitant phase errors.

In this preliminary implementation, only three healthy volunteers were recruited for in vivo validation; a larger study will be performed in the future. Parallel imaging and compressed sensing enable further data acceleration for spiral SPACE. In this work, the disclosure used variable density spiral trajectories and accelerated the data acquisition along the interleave domain. Note that the acceleration can also be performed along the partition encoding direction via parallel imaging and/or partial Fourier reconstruction as in conventional Cartesian SPACE. Compared to the vendor provided Cartesian SPACE which uses the GRAPPA acceleration method, the proposed spiral SPACE shows obvious noise reduction yet with some image blurriness due to the L1-constraint. Advanced image reconstruction may be applied to this method, such as deep learning based de-aliasing and/or de-noising which have shown superior image quality and less computational cost compared to conventional image reconstruction methods [16, 17].

Embodiments of the Disclosure

In one embodiment, a computer implemented method of gathering three-dimensional (3D) magnetic resonance imaging (MRI) data using spiral-in-out encoding trajectories from a k-space encoding orientation 540 and a spoiler gradient direction 550 and includes using a computer having a processor and computer memory to implement steps of calculating a variable flip angle radio frequency (RF) series 560 for use as refocusing pulses, wherein the RF series comprises a plurality of refocusing RF pulses 575; applying a spoiler gradient waveform 580 along the spoiler gradient direction 550, wherein the computer alternately adds and subtracts partition encoding waveforms to the spoiler gradient waveform 580; reading MRI data with the computer for each encoding step associated with the k-space encoding orientation 540 during an MRI sequence that further includes inserting a spiral-in gradient 597 before a first refocusing RF pulse 575 from the RF sequence 560; overlapping a prewinder lobe 597 for the encoding trajectory with the spoiler gradient waveform having the partition encoding waveforms added therein 582; and overlapping a rewinder lobe 598 for the encoding trajectory with the spoiler gradient waveform having the partition encoding waveforms subtracted there from 583.

In another embodiment, the computer implemented method further repeats the MRI sequence for a selected number of total partition encodings to obtain data for a 3D MRI acquisition.

In another embodiment, the computer implemented method includes calculating the RF series comprises identifying a target signal curve having an asymptotic pseudo-steady state stabilization.

In another embodiment, The computer implemented method includes identifying the variable flip angle radio frequency (RF) series to meet the target signal curve and selected parameters for the MRI sequence.

In another embodiment, the computer implemented method includes the selected parameters being selected from the group consisting of field of view, echo spacing, effective TE, readout time, a target number of shots during the MRI sequence, a total number of echoes per shot, an acceleration ratio, a spatial resolution, a k-space center location relative to a selected number of total partition encodings, or a target signal-to-noise ratio.

In another embodiment, the computer implemented method includes each of the refocusing pulses corresponding to a respective variable flip angle used in the MRI sequence.

In another embodiment, the computer implemented method includes using the MRI sequence to extend a useable duration of an echo train by increasing the refocusing flip angles to slow signal decay due to T2 relaxation.

In another embodiment, the computer implemented method includes applying the MRI sequence at a low static magnetic-field strength.

In another embodiment, the computer implemented method includes the low static magnetic-field strength is less than or equal to 1 Tesla.

In another embodiment, the computer implemented method includes applying the MRI sequence at a medium static magnetic-field strength greater than 1 Tesla and less than or equal to 3 Tesla.

In another embodiment, the computer implemented method includes applying the MRI sequence at a static magnetic-field strength greater than 3 Tesla.

In another embodiment, the computer implemented method uses a turbo-spin-echo imaging sequence.

In another embodiment, the computer implemented method includes the spiral-in-out encoding trajectories having either constant density spirals or variable density spirals.

In another embodiment, the computer implemented method includes reading the MRI data with a time symmetric spiral-in-out sampling scheme.

In another embodiment, the computer implemented method includes forming an MRI output by fully sampling the MRI data or by under-sampling the MRI data.

In another embodiment, the computer implemented method includes accelerating the reading of MRI data by utilizing parallel imaging and/or compressed sensing techniques, wherein the parallel imaging comprises 1D or 2D acceleration.

In another embodiment, the computer implemented method includes applying trajectory correction to the MRI data.

In another embodiment, the computer implemented method includes the trajectory correction in the form of a gradient impulse response function (GIRF).

In another embodiment, the computer implemented method includes applying sequence-based concomitant field compensation.

In another embodiment, the computer implemented method includes applying echo re-ordering to the MRI data prior to image reconstruction.

In another embodiment, the computer implemented method includes echo re-ordering by reversing an echo order during a measurement.

In another embodiment, the computer implemented method includes signal averaging that is normalized based on a simulated signal decay from the RF-series calculation and relaxation parameters.

In another embodiment, the computer implemented method includes that the MRI sequence is conducted pursuant to turbo-spin-echo imaging sequences according to the method Sampling Perfection with Application optimized Contrasts using different flip angle Evolutions (TSE-SPACE).

In another embodiment, the computer implemented method includes reading the MRI data from about 100 to about 250 echoes for each echo train.

In another embodiment, the computer implemented method includes reading the MRI data with echo spacing between about 3 ms and 4 ms, inclusive.

In another embodiment, the computer implemented method includes the refocusing RF pulses being spatially non-selective.

In another embodiment, the computer implemented method includes refocusing RF pulses corresponding to flip angles between about 30 degrees to 120 degrees, inclusive.

In another embodiment, the computer implemented method further includes partial Fourier imaging with zero-interpolation filling to reduce imaging time.

In another embodiment, the computer implemented method further includes applying k-space encoding trajectories with sampling in both in-plane and through-slab phase-encode directions.

In another embodiment, the computer implemented method includes using the MRI sequence to create T1-weighted, T2-weighted, PD-weighted, or FLAIR images.

In another embodiment, the computer implemented method includes the k-space encoding orientation having two imaging directions that are different from the spoiler gradient direction.

In another embodiment, the computer implemented method calculates the variable flip angle radio frequency (RF) series by calculating an extended phase graph (EPG) to identify a target signal curve, and matching the variable flip angle RF series to the target signal curve.

In another embodiment, a computerized system for gathering three-dimensional (3D) magnetic resonance imaging (MRI) data using spiral-in-out encoding trajectories from a k-space encoding orientation and a spoiler gradient direction includes a source of a magnetic gradient connected to a computer having a processor and computer memory to implement steps including calculating a variable flip angle radio frequency (RF) series for use as refocusing pulses, wherein the RF series comprises a plurality of refocusing RF pulses; applying a spoiler gradient waveform along the spoiler gradient direction, wherein the computer alternately adds and subtracts partition encoding waveforms to the spoiler gradient waveform; reading MRI data with the computer for each encoding step associated with the k-space encoding orientation during an MRI sequence further comprising: inserting a spiral-in gradient before a first refocusing RF pulse from the RF sequence; overlapping a prewinder lobe for the encoding trajectory with the spoiler gradient waveform having the partition encoding waveforms added therein; and overlapping a rewinder lobe for the encoding trajectory with the spoiler gradient waveform having the partition encoding waveforms subtracted there from.

CONCLUSION

The specific configurations, choice of materials and the size and shape of various elements can be varied according to particular design specifications or constraints requiring a system or method constructed according to the principles of the disclosed technology. Such changes are intended to be embraced within the scope of the disclosed technology. The presently disclosed embodiments, therefore, are considered in all respects to be illustrative and not restrictive. The patentable scope of certain embodiments of the disclosed technology is indicated by the appended claims, rather than the foregoing description.

REFERENCES

The following patents, applications and publications as listed below and throughout this document are hereby incorporated by reference in their entirety herein.
1. Mugler J P 3rd. Optimized three-dimensional fast-spin-echo MRI. *J Magn Reson Imaging.* 2014; 39(4): 745-767.
2. Hennig J, Weigel M, Scheffler K. Calculation of flip angles for echo trains with predefined amplitudes with the extended phase graph (EPG)-algorithm: principles and applications to hyperecho and TRAPS sequences. *Magn Reson Med.* 2004; 51: 68-80.
3. Busse R F, Hariharan H, Vu A, Brittain J H. Fast spin echo sequences with very long echo trains: design of variable refocusing flip angle schedules and generation of clinical T2 contrast. *Magn Reson Med.* 2006; 55(5): 1030-1037.
4. Campbell-Washburn A E et al. Opportunities in interventional and diagnostic imaging by using high-performance low-field-strength MRI. *Radiology.* 2019; 293:384-393.
5. Li Z, Wang D, Robison R K, et al. Sliding-slab three-dimensional TSE imaging with a spiral-in/out readout. *Magn Reson Med.* 2016; 75:729-738.
6. Wang Z, Allen S P, Feng X, Mugler J P, Meyer C H. SPRING-RIO TSE: 2D T2-Weighted Turbo Spin-Echo Brain Imaging using SPiral RINGs with Retraced In/Out Trajectories. *Magn Reson Med.* 2022; 88:601-616.
7. Restivo M C, Ramasawmy R, Bandettini W P, Herzka D A, Campbell-Washburn A E. Efficient spiral in-out and EPI balanced steady-state free precession cine imaging using a high-performance 0.55 T MRI. *Magn Reson Med.* 2020; 84:2364-2375.
8. Wang Z, Ramasawmy R, Feng X, Campbell-Washburn A E, Mugler J P, Meyer C H. Concomitant magnetic-field compensation for 2D spiral-ring turbo spin-echo imaging at 0.55 T and 1.5 T. *Magn Reson Med.* 2023; 90(2):552-568.
9. Ramasawmy R, Mugler J P, Ahsan J, Wang Z, Herzka D A, Meyer C H, Campbell-Washburn A E. Concomitant field compensation of spiral turbo spin-echo at 0.55 T. *Magn Reson Mater Phy.* 2023; 10.1007/s10334-023-01103-0.
10. Zhou X J, Tan S G, Bernstein M A. Artifacts induced by concomitant magnetic field in fast spin-echo imaging. *Magn Reson Med.* 1998; 40:582-591.
11. Vannesjo S J, Haeberlin M, Kasper L, Pavan M, Wilm B J, Barmet C, Pruessmann K P. Gradient system characterization by impulse response measurements with a dynamic field camera. *Magn Reson Med.* 2013; 69: 583-593.
12. Li Z, Karis J P, Pipe J G. A 2D spiral turbo-spin-echo technique. *Magn Reson Med.* 2018; 80:1989-1996.
13. Uecker M, Lai P, Murphy M J, Virtue P, Elad M, Pauly J M, Vasanawala S S, Lustig M. ESPIRIT—an eigenvalue approach to auto-calibrating parallel MRI: where SENSE meets GRAPPA. *Magn Reson Med.* 2014; 71:990-1001.
14. Griswold M A, Jakob P M, Heidemann R M, Nittka M, Jellus V, Wang J, Kiefer B, Haase A. Generalized autocalibrating partially parallel acquisitions (GRAPPA). *Magn Reson Med.* 2002; 47:1202-1210.
15. Robson P M, Grant A K, Madhuranthakam A J, Lattanzi R, Sodickson D K, Mckenzie C A. Comprehensive quantification of signal-to-noise ratio and g-factor for image-based and k-space based parallel imaging reconstructions. *Magn Reson Med.* 2008; 60:895-907.
16. Koonjoo N, Zhu B, Bagnall G C, Bhutto D, Rosen M S. Boosting the signal-to-noise of low-field MRI with deep learning image reconstruction. *Sci Rep.* 2021; 11(1):8248.
17. Dou Q, Wang Z, Feng X, Meyer C H. MRI Denoising with a Non-Blind Deep Complex-Valued Convolutional Neural Network. In Proceedings of the 32nd Annual Meeting of ISMRM, Toronto, C A, 2023.p. 3887.

The invention claimed is:
1. A computer implemented method of gathering three-dimensional (3D) magnetic resonance imaging (MRI) data using spiral-in-out encoding trajectories from a k-space encoding orientation and a spoiler gradient direction, the method comprising:
  using a computer having a processor and computer memory to implement steps comprising:
  calculating a variable flip angle radio frequency (RF) series for use as refocusing pulses, wherein the RF series comprises a plurality of refocusing RF pulses;
  applying a spoiler gradient waveform along the spoiler gradient direction, wherein the computer alternately adds and subtracts partition encoding waveforms to the spoiler gradient waveform;
  reading MRI data with the computer for each encoding step associated with the k-space encoding orientation during an MRI sequence further comprising:
  inserting a spiral-in gradient before a first refocusing RF pulse from the RF sequence;
  overlapping a prewinder lobe for the encoding trajectory with the spoiler gradient waveform having the partition encoding waveforms added therein; and overlapping a rewinder lobe for the encoding trajectory with the spoiler gradient waveform having the partition encoding waveforms subtracted there from.

2. The computer implemented method of claim 1, further repeating the MRI sequence for a selected number of total partition encodings to obtain data for a 3D MRI acquisition.

3. The computer implemented method of claim 1, wherein calculating the RF series comprises identifying a target signal curve having an asymptotic pseudo-steady state stabilization.

4. The computer implemented method of claim 3, further comprising identifying the variable flip angle radio frequency (RF) series to meet the target signal curve and selected parameters for the MRI sequence.

5. The computer implemented method of claim 4, wherein the selected parameters are selected from the group consisting of field of view, echo spacing, effective TE, readout time, a target number of shots during the MRI sequence, a total number of echoes per shot, an acceleration ratio, a spatial resolution, a k-space center location relative to a selected number of total partition encodings, or a target signal-to-noise ratio.

6. The computer implemented method of claim 1, wherein each of the refocusing pulses corresponds to a respective variable flip angle used in the MRI sequence.

7. The computer implemented method of claim 1, further comprising using the MRI sequence to extend a useable duration of an echo train by increasing the refocusing flip angles to slow signal decay due to T2 relaxation.

8. The computer implemented method of claim 1, further comprising applying the MRI sequence at a low static magnetic-field strength.

9. The computer implemented method of claim 1, wherein the low static magnetic-field strength is less than or equal to 1 Tesla.

10. The computer implemented method of claim 1, wherein the MRI sequence comprises a turbo-spin-echo imaging sequence.

11. The computer implemented method of claim 1, wherein the spiral-in-out encoding trajectories comprise either constant density spirals or variable density spirals.

12. The computer implemented method of claim 1, further comprising reading the MRI data with a time symmetric spiral-in-out sampling scheme.

13. The computer implemented method of claim 1, further comprises forming an MRI output by fully sampling the MRI data or by under-sampling the MRI data.

14. The computer implemented method of claim 1, further comprising accelerating the reading of MRI data by utilizing parallel imaging and/or compressed sensing techniques, wherein the parallel imaging comprises 1D or 2D acceleration.

15. The computer implemented method of claim 1, further comprising applying trajectory correction to the MRI data.

16. The computer implemented method of claim 15, wherein the trajectory correction is a gradient impulse response function (GIRF).

17. The computer implemented method of claim 16, further comprising applying sequence-based concomitant field compensation.

18. The computer implemented method of claim 1, further comprising applying echo re-ordering to the MRI data prior to image reconstruction.

19. The computer implemented method of claim 18, wherein echo re-ordering comprises reversing an echo order during a measurement.

20. A computerized system for gathering three-dimensional (3D) magnetic resonance imaging (MRI) data using spiral-in-out encoding trajectories from a k-space encoding orientation and a spoiler gradient direction, the system comprising:
a source of a magnetic gradient connected to a computer having a processor and computer memory to implement steps comprising:
calculating a variable flip angle radio frequency (RF) series for use as refocusing pulses, wherein the RF series comprises a plurality of refocusing RF pulses;
applying a spoiler gradient waveform along the spoiler gradient direction, wherein the computer alternately adds and subtracts partition encoding waveforms to the spoiler gradient waveform;
reading MRI data with the computer for each encoding step associated with the k-space encoding orientation during an MRI sequence further comprising:
inserting a spiral-in gradient before a first refocusing RF pulse from the RF sequence;
overlapping a prewinder lobe for the encoding trajectory with the spoiler gradient waveform having the partition encoding waveforms added therein; and
overlapping a rewinder lobe for the encoding trajectory with the spoiler gradient waveform having the partition encoding waveforms subtracted there from.

* * * * *